Patented July 14, 1931

1,814,768

UNITED STATES PATENT OFFICE

HUGH F. RIPPEY, CHARLES N. CONE, GLENN DAVIDSON, IRVING F. LAUCKS, AND HARRY P. BANKS, OF SEATTLE, WASHINGTON

PROCESS OF MAKING A WATER RESISTANT, ANIMAL PROTEIN ADHESIVE, AND THE PRODUCT THEREOF

No Drawing.  Application filed April 24, 1926. Serial No. 104,455.

Our invention relates to the process of making a water resistant, protein adhesive and to the product thereof.

In the production of water resistant adhesives, we have found that addition of carbon bisulphide and other sulphur derivatives of carbonic acid, such as xanthates, thio-carbonates and thio carbanilid, etc. to adhesive formulas comprising animal proteins and alkaline compounds, the water resistance is greatly increased in those already water resistant to some extent, and those formerly not at all water resistant become highly water resistant. Also there is a considerable increase in the dry adhesion, or adhesive strength.

For instance, addition of carbon bisulphide and other sulphur derivatives of carbonic acid to casein glue formulas greatly increases the water-resistance of such casein glues. Again, addition of carbon bisulphide to ordinary hide glue, with or without added alkalinity, produces a water resistant glue, whereas, without the addition of carbon bisulphide or/and water-resistance-producing carbon-sulphur compounds the glue was not at all water resistant.

By the term animal proteins we mean to include not only milk casein and hide and bone glue, but also blood albumen, gelatine, fish glue, egg albumen and other animal proteins, as the addition of carbon bisulphide or other sulphur derivatives of carbonic acid is beneficial in producing water resistance in adhesives composed in whole or in part of these animal proteins, or in increasing such water resistance where same already existed to some extent.

The reactions are extremely complex. Our experiments indicate that some thio-carbonates are formed, and additions of thio-carbonates have been found to be beneficial. When carbon bisulphide is added to an alkaline solution as caustic soda, sodium thio-carbonate and other similar carbon-sulphur compounds are formed. Caustic soda is a common ingredient in casein glues, so that when carbon bisulphide is added to such a glue, containing caustic soda, it may be that part of the action is due to the effect of carbon bisulphide directly on the casein, and part due to the effect of the thio-carbonate or other similar compounds formed acting in turn on the casein.

On the other hand, for example with hide glue, we have found the water resistance is produced with no alkali present. In such case it appears therefore that the effect must be due to the action of the sulphur derivative of carbonic acid directly on the protein, as these are the only two ingredients present, save water. But we also find an increased water resistance with animal glue when a small amount of caustic soda or other alkali is present. This added effect may then be due to the action of thio-carbonates or other sulphur derivatives of carbonic acid.

We do not restrict our claims to the compounds named above but we claim as equivalents any sulphur derivatives of carbonic acid producing like effects on proteins, i. e., increased water resistance and increased dry adhesive strength. In illustration of successful formulas, including the use of carbon bisulphide and equivalent carbon-sulphur compounds, we list the following:

|  | Parts |
|---|---|
| (1) Casein | 400 |
| Calcium hydrate | 80 |
| Sodium silicate | 280 |
| Carbon bisulphide | 20 |
| Water | 1200 |
| (2) A dry mixture consisting of: | |
| Lime | 22 |
| Tri sodium phosphate | 6.5 |
| Casein | 60–250 |
| Organic material of indeterminate composition | 11.5 |
| Carbon bisulphide | 20 |
| Water | 500 |
| (3) Dry hide glue | 200 |
| Carbon bisulphide | 2 |
| Water | 600 |
| (4) Dry hide glue | 200 |
| Carbon bisulphide | 12 |
| Water | 600 |
| (5) Dry hide glue | 200 |
| Calcium hydrate | 1.5 |

|     | | Parts |
| --- | --- | --- |
|     | Carbon bisulphide | 5 |
|     | Water | 600 |
| (6) | Dry hide glue | 200 |
|     | Caustic soda | 1.5 |
|     | Carbon bisulphide | 10 |
|     | Water | 600 |
| (7) | Soluble black blood albumen | 100 |
|     | Ammonia | 5½ |
|     | Carbon bisulphide | 5 |
|     | Water | 200 |
| (8) | Dried egg albumen | 100 |
|     | Ammonia | 5½ |
|     | Carbon bisulphide | 5 |
|     | Water | 600 |
| (9) | Casein | 300 |
|     | Calcium hydrate | 60 |
|     | Sodium silicate | 210 |
|     | Thio-carbanilid | 20 |
|     | Water | 960 |
| (10) | Casein | 300 |
|     | Calcium hydrate | 60 |
|     | Sodium fluoride | 20 |
|     | Potassium xanthate | 10 |
|     | Water | 1000 |
| (11) | Dry hide glue | 200 |
|     | Water | 600 |
|     | Calcium hydrate | 1.5 |
|     | Thio-carbanilid | 10 |
| (12) | Dry hide glue | 200 |
|     | Water | 600 |
|     | Calcium hydrate | 1.5 |
|     | Potassium xanthate | 10 |
| (13) | Blood albumen | 100 |
|     | Ammonia | 5½ |
|     | Potassium xanthate | 7 |
|     | Water | 200 |

The process of mixing the above will be well known to those skilled in the art. The dry components are first mixed together and then the liquid components of the above formulas are added.

We do not wish to restrict ourselves to the formulas or proportions given in the above examples as other formulas and other proportions have been found to develop water resistance in animal protein adhesives.

Such adhesives are applicable to wood working and other glues to textile and paper size, to plastic compositions, to wall sizes and to other purposes for which adhesives are used.

What we claim is—

1. The process of manufacturing a water resistant adhesive which comprises treating an adhesive mixture containing protein of animal origin in aqueous media with carbon bisulphide.

2. The process of manufacturing a water resistant adhesive which comprises treating an adhesive mixture containing casein in aqueous media with a sulphur derivative of carbonic acid.

3. The process of manufacturing a water resistant adhesive which comprises treating an adhesive mixture containing casein in aqueous media with carbon bisulphide.

4. The process of manufacturing a water resistant adhesive which comprises treating an adhesive mixture containing protein of animal origin in alkaline aqueous media with a sulphur derivative of carbonic acid.

5. The process of manufacturing a water resistant adhesive which comprises treating an adhesive mixture containing protein of animal origin in alkaline aqueous media with carbon bisulphide.

6. The process of manufacturing a water resistant adhesive which comprises treating an adhesive mixture containing casein in alkaline aqueous media with a sulphur derivative of carbonic acid.

7. The process of manufacturing a water resistant adhesive which comprises treating an adhesive mixture containing casein in alkaline aqueous media with carbon bisulphide.

8. A water resistant adhesive composition comprising protein of animal origin and carbon bisulphide.

9. A water resistant adhesive composition comprising casein and a sulphur derivative of carbonic acid.

10. A water resistant adhesive composition comprising casein and carbon bisulphide.

11. A water resistant adhesive composition comprising protein of animal origin, an alkaline compound and a sulphur derivative of carbonic acid.

12. A water resistant adhesive composition comprising protein of animal origin, an alkaline compound and carbon bisulphide.

13. A water resistant adhesive composition comprising casein, an alkaline compound and a sulphur derivative of carbonic acid.

14. A water resistant adhesive composition comprising casein, an alkaline compound and carbon bisulphide.

In witness whereof, we hereunto subscribe our names this 19th day of April, 1926.

HUGH F. RIPPEY.
CHARLES N. CONE.
GLENN DAVIDSON.
IRVING F. LAUCKS.
HARRY P. BANKS.